United States Patent
Akiyama

(10) Patent No.: US 11,555,913 B2
(45) Date of Patent: Jan. 17, 2023

(54) OBJECT RECOGNITION DEVICE AND OBJECT RECOGNITION METHOD

(71) Applicant: Mitsubishi Electric Corporation, Tokyo (JP)

(72) Inventor: Tomohiro Akiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 61 days.

(21) Appl. No.: 16/650,686

(22) PCT Filed: Nov. 13, 2017

(86) PCT No.: PCT/JP2017/040687
§ 371 (c)(1),
(2) Date: Mar. 25, 2020

(87) PCT Pub. No.: WO2019/092874
PCT Pub. Date: May 16, 2019

(65) Prior Publication Data
US 2020/0225342 A1     Jul. 16, 2020

(51) Int. Cl.
*G01S 13/87* (2006.01)
*G01B 11/02* (2006.01)
*G01S 13/931* (2020.01)
*G01S 13/00* (2006.01)

(52) U.S. Cl.
CPC .............. *G01S 13/87* (2013.01); *G01B 11/02* (2013.01); *G01S 13/931* (2013.01); *G01S 2013/932* (2020.01); *G01S 2013/93271* (2020.01)

(58) Field of Classification Search
None
See application file for complete search history.

(56) References Cited

U.S. PATENT DOCUMENTS 9,797,734 B2 * 10/2017 Mizutani ............... G01S 13/931
9,805,274 B2 * 10/2017 Ayvaci ....................... G06T 7/13
2009/0040094 A1   2/2009 Harada et al.
(Continued)

FOREIGN PATENT DOCUMENTS

JP    4371115 B2   11/2009
JP    6194520 B1    9/2017
KR  101784611 B1   11/2017

OTHER PUBLICATIONS

Communication dated Apr. 21, 2021, from the China National Intellectual Property Administration on application No. 201780096504.X.

(Continued)

*Primary Examiner* — Bernarr E Gregory
(74) *Attorney, Agent, or Firm* — Sughrue Mion, PLLC; Richard C. Turner

(57) ABSTRACT

In this object recognition device, an association between a first object detection result and a second object detection result is taken in a region excluding an occlusion area. When the first object detection result and the second object detection result are determined to be detection results for an identical object, a recognition result of the surrounding object is calculated from the first object detection result and the second object detection result. Thus, occurrences of erroneous recognition of an object can be decreased as compared to a conventional object recognition device of a vehicle.

10 Claims, 13 Drawing Sheets

(56) References Cited

U.S. PATENT DOCUMENTS

| | | | | |
|---|---|---|---|---|
| 2014/0347475 | A1* | 11/2014 | Divakaran | G06K 9/00771 |
| | | | | 348/135 |
| 2017/0206436 | A1* | 7/2017 | Schiffmann | G01S 13/931 |
| 2017/0254895 | A1* | 9/2017 | Tong | G01S 13/931 |
| 2017/0336504 | A1* | 11/2017 | Kai | G01S 13/931 |
| 2017/0356993 | A1 | 12/2017 | Lee et al. | |
| 2017/0372149 | A1 | 12/2017 | Mori | |
| 2018/0067490 | A1* | 3/2018 | Pollach | G05D 1/0255 |

OTHER PUBLICATIONS

International Search Report for PCT/JP2017/040687 dated Jan. 23, 2018 [PCT/ISA/210].
Written Opinion for PCT/JP2017/040687 dated Jan. 23, 2018 [PCT/ISA/237].
Communication dated Dec. 6, 2021, from the China National Intellectual Property Administration in CN Application No. 201780096504.X.
Darko Musicki et al., "Linear Joint Integrated Probabilistic Data Association—LJIPDA", Proceedings of the 41st IEEE, Conference on Decision and Control, Las Vegas, Nevada USA, Dec. 2002, ThA02-2, pp. 2415-2420 (6 pages).

\* cited by examiner

OBJECT RECOGNITION DEVICE AND OBJECT RECOGNITION METHOD

CROSS REFERENCE TO RELATED APPLICATIONS

This application is a National Stage of International Application No. PCT/JP2017/040687 filed Nov. 13, 2017.

TECHNICAL FIELD

The present invention relates to an object recognition device and an object recognition method.

BACKGROUND ART

Conventionally, for recognizing the situation around the own vehicle, two object detection units different in detection characteristics, which are, for example, an image processing unit (e.g., camera) and a radar measurement unit (e.g., millimeter-wave radar), are mounted on the vehicle. The image processing unit detects a vehicle-to-vehicle distance, a direction, a relative velocity, a vehicle width, and a position in the lane, of another vehicle traveling in front of the own vehicle. In addition, the radar measurement unit detects a vehicle-to-vehicle distance, a direction, and a relative velocity of another vehicle traveling in front of the own vehicle. The detection results from the image processing unit and the radar measurement unit are sent to an integrated processing unit via the network, and the integrated processing unit determines whether or not the detection results from the radar measurement unit and the image processing unit are for an identical vehicle. If it is determined that the detection results are for an identical same vehicle, the detection results are transferred as sensor information to a vehicle control device via the in-vehicle network.

The vehicle control device is provided with vehicle applications for improving safety and comfort of the vehicle, such as a collision damage mitigation brake system for mitigating a damage when the own vehicle collides with a frontward object, an adaptive cruise control system for following a frontward vehicle, and an automatic parking system for automatically parking to a parking space, and the aforementioned sensor information is used for these vehicle applications.

As technology for improving sensing performance for a surrounding object around the own vehicle in the image processing unit and the radar measurement unit described above or the like, technology enabling accurate estimation for the position of a target using detection values of a plurality of sensors having different detection accuracies is disclosed (see, for example, Patent Document 1).

CITATION LIST

Patent Document

Patent Document 1: Japanese Patent No. 4371115

SUMMARY OF THE INVENTION

Problems to be Solved by the Invention

The conventional object recognition device composed of the image processing unit, the radar measurement unit, and the integrated processing unit described above might cause erroneous recognition for an object detected by the radar measurement unit in an area (occlusion area) where the image processing unit cannot detect a target object because the target object is hidden by another object, and a different object detected by the image processing unit in an area other than the occlusion area. In such a case, even though these objects are not actually an identical object, they might be determined to be an identical object.

When the originally identical object is recognized as another object as described above, the following problems arise.

(1) In the case of performing control while tracking the object, track of the object being tracked is lost, whereby lag of the control might occur.

(2) In the case of performing control while tracking the object, track of the object being tracked is lost, so that the control that should be originally performed is not performed. Conversely, a situation in which control that originally should not be performed is performed, might occur.

(3) In an area where the detection area of the image processing unit and the detection area of the radar measurement unit overlap each other, an output is obtained only from the radar measurement unit, so that the detection is recognized as erroneous detection and the actually existing object might be overlooked.

Considering the above circumstances, an object of the present invention is to provide an object recognition device that accurately determines an occlusion area for object detection means such as an image processing unit that causes an occlusion area, and calculates an association of two or more outputs of the object detection means, to output a result of object recognition, thereby enabling decrease in occurrences of erroneous recognition of an object as compared to a conventional object recognition device of a vehicle.

Solution to the Problems

An object recognition device according to the present invention includes: first object detection means mounted on a vehicle and configured to detect a surrounding object around the vehicle, the first object detection means causing an occlusion area according to the detected surrounding object; an occlusion area detection processing unit configured to determine the caused occlusion area; object detection generation means configured to generate a second object detection result of which an association is to be taken with a first object detection result of the first object detection means; an association processing unit configured to take an association between the first object detection result and the second object detection result in an area excluding the occlusion area determined by the occlusion area detection processing unit; and an update processing unit configured to, when the association processing unit determines that the first object detection result and the second object detection result are detection results for an identical object, calculate a recognition result for the surrounding object on the basis of the first object detection result and the second object detection result, and update the recognition result, wherein the vehicle is controlled on the basis of the recognition result of the update processing unit.

Effect of the Invention

The object recognition device according to the present invention enables decrease in occurrences of erroneous recognition of an object.

DESCRIPTION OF EMBODIMENTS

Embodiment 1

Figure 1:
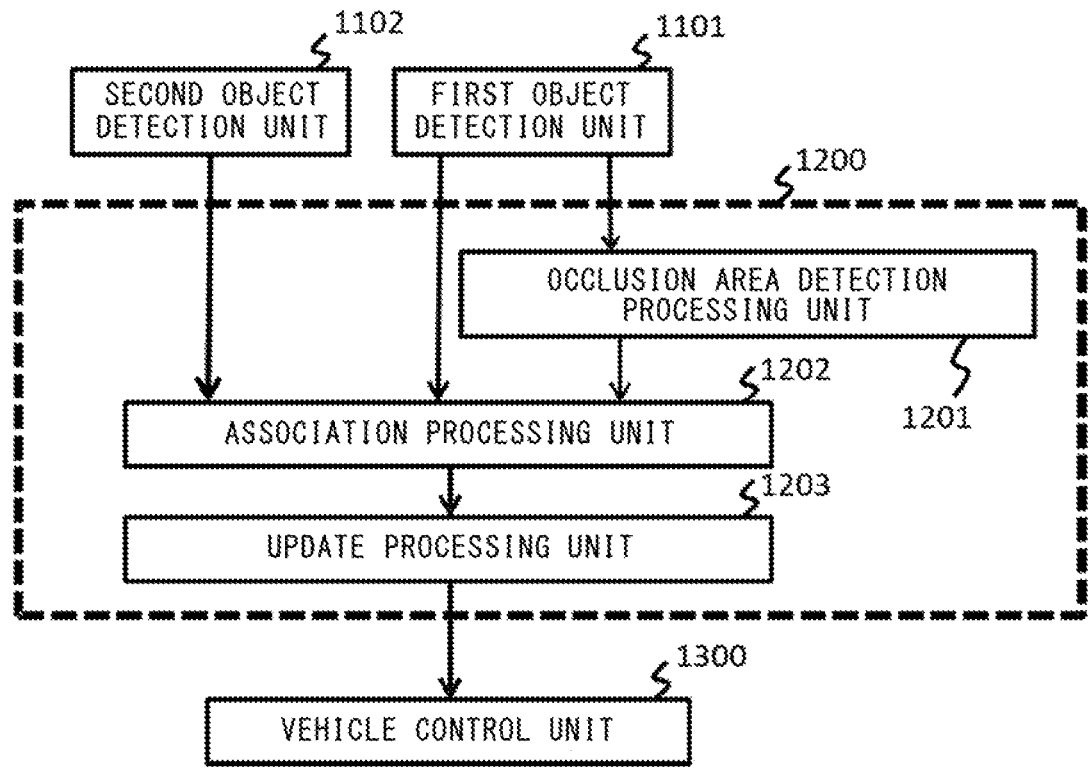
FIG. 1 is a block configuration diagram of an object recognition device according to embodiment 1 of the present invention.

FIG. 1 is a block configuration diagram showing the object recognition device according to embodiment 1 of the present invention, together with a vehicle control unit 1300. It is noted that arrows in FIG. 1 indicate flows of signals.

The object recognition device includes a first object detection unit 1101, a second object detection unit 1102, and an object recognition processing unit 1200, and the object recognition processing unit 1200 includes an occlusion area detection processing unit 1201, an association processing unit 1202, and an update processing unit 1203.

The first object detection unit 1101 is composed of a device such as a camera or a light detection and ranging (lidar) device, which is capable of acquiring an object detection position and in addition, object width information. The second object detection unit 1102 is composed of a device capable of acquiring an object detection position, e.g., a radio detection and ranging (radar) device, an ultrasonic sensor, or an inter-vehicle communication device (which refers to a communication device between a plurality of vehicles). In embodiment 1 of the present invention, the case of using the two object detection units is described. However, three or more object detection units may be used. In any case, it is necessary that the object detection unit capable of obtaining object width information is included.

Figure 2:
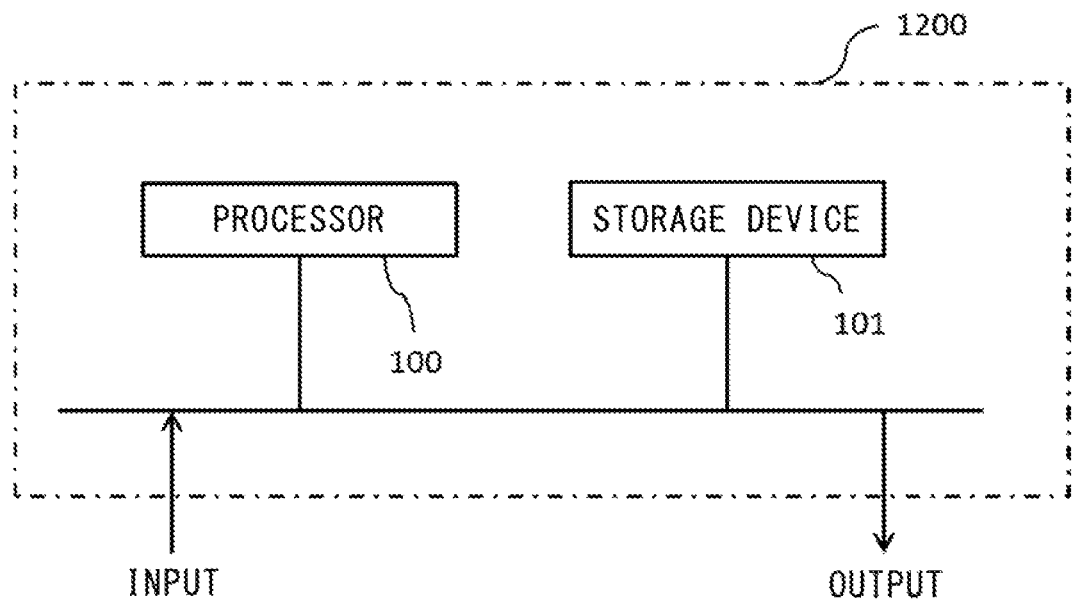
FIG. 2 is a hardware configuration diagram of an object recognition processing unit of the object recognition device according to embodiment 1 of the present invention.

The object recognition processing unit 1200 is composed of a processor 100 and a storage device 101, as shown in FIG. 2 which shows an example of hardware thereof. Although not shown, the storage device is provided with a volatile storage device such as a random access memory and a nonvolatile auxiliary storage device such as a flash memory. Instead of the flash memory, an auxiliary storage device of a hard disk may be provided. The processor 100 executes a program inputted from the storage device 101. The program is based on an application corresponding to a flowchart shown in FIG. 3, for example. In this case, the program is inputted from the auxiliary storage device to the processor 100 via the volatile storage device. In addition, the processor 100 may output data such as a calculation result to the volatile storage device of the storage device 101, or may store the data into the auxiliary storage device via the volatile storage device.

Next, operation for determining an occlusion area for the object recognition device configured as described above, and a process until calculation of an object recognition result for object position information to be transmitted to the vehicle control unit 1300, will be described with reference to FIG. 3 to FIG. 5D.

Figure 3:
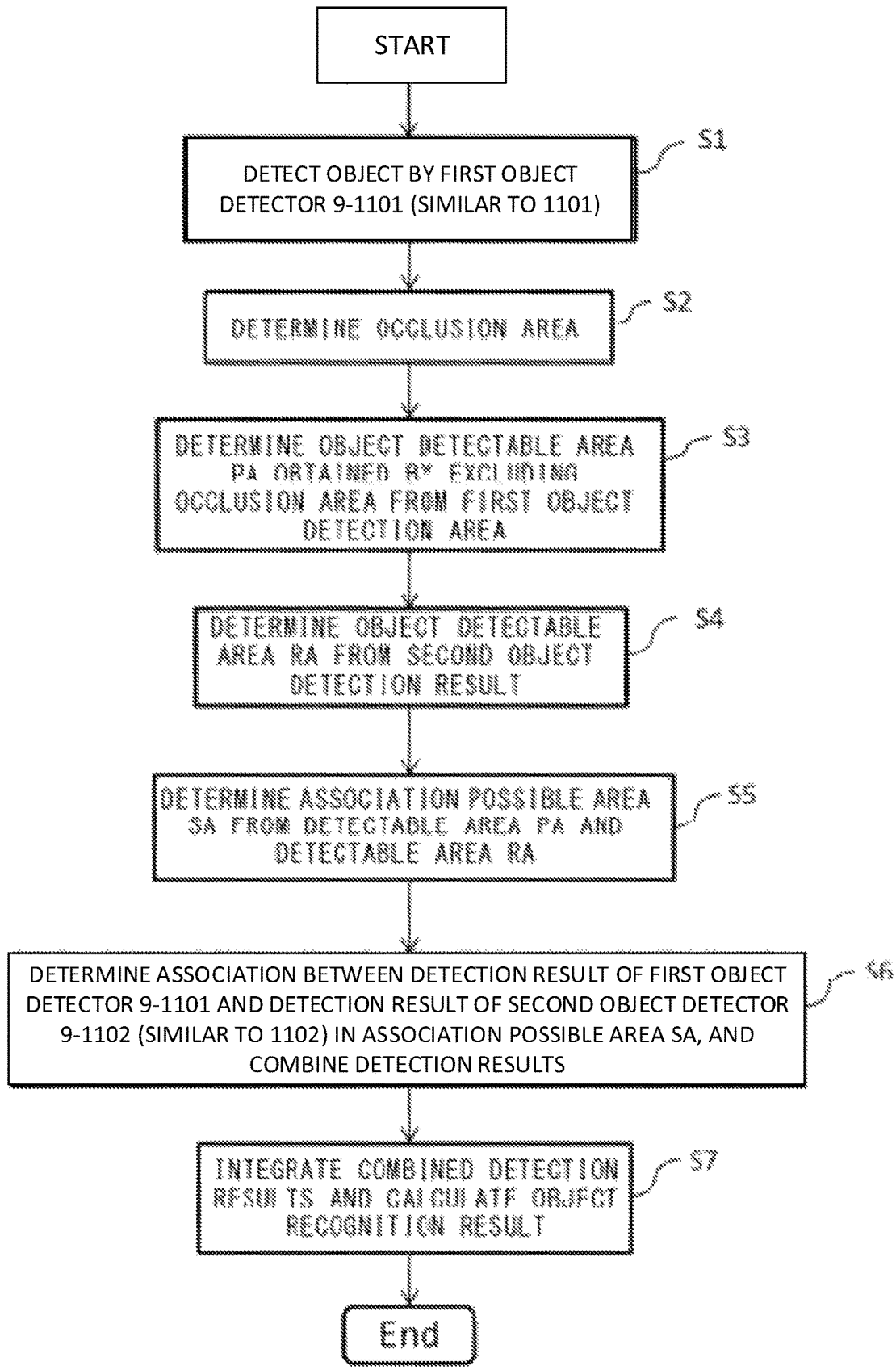
FIG. 3 is a flowchart showing operation of the object recognition device according to embodiment 1 of the present invention.
Figure 9A:
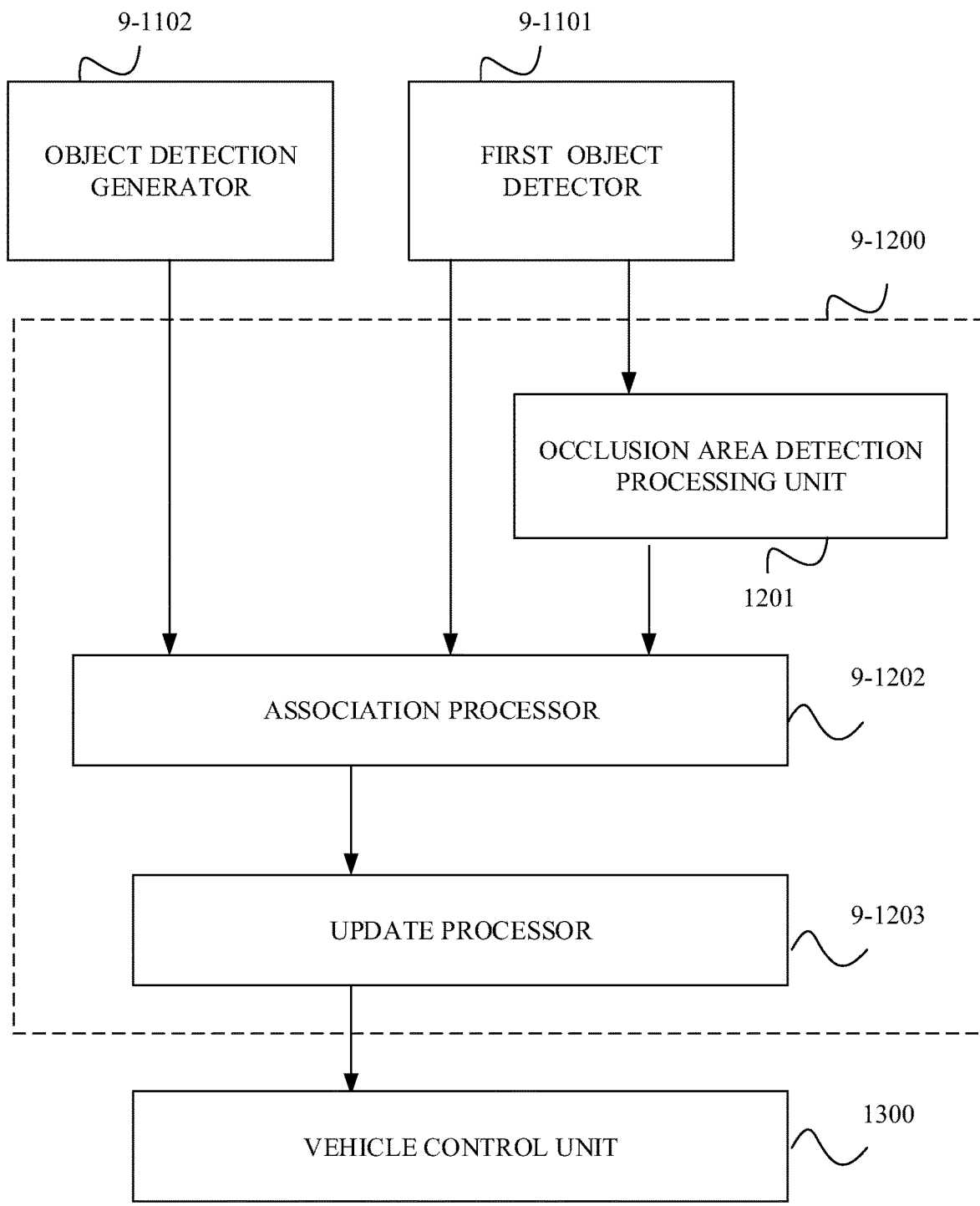
FIG. 9A, similar to FIG. 1, is a block configuration diagram of an object recognition device according to embodiment 1 of the present invention.

An object detection position measured by the first object detector 9-1101 (also see FIG. 9A, 9-1101 is similar to first object detection unit 1101) and object detection position accuracy information thereof are outputted as an object detection position signal and an object detection position accuracy signal to the occlusion area detection processing unit 1201 and the association processing unit 1202 (step S1 in the flowchart in FIG. 3). First object detection unit 1101 may also be referred to as first object detector 9-1011. Second object detection unit 11-2 may be referred to as second object detector 9-1102. The output of the first object detection unit 1101 also includes an object width signal, and this signal is also outputted to the occlusion area detection processing unit 1201 and the association processing unit 1202. An object detection position measured by the second object detection unit 1102 and object detection position accuracy information thereof are outputted to the association processing unit 1202.

Figure 4A:
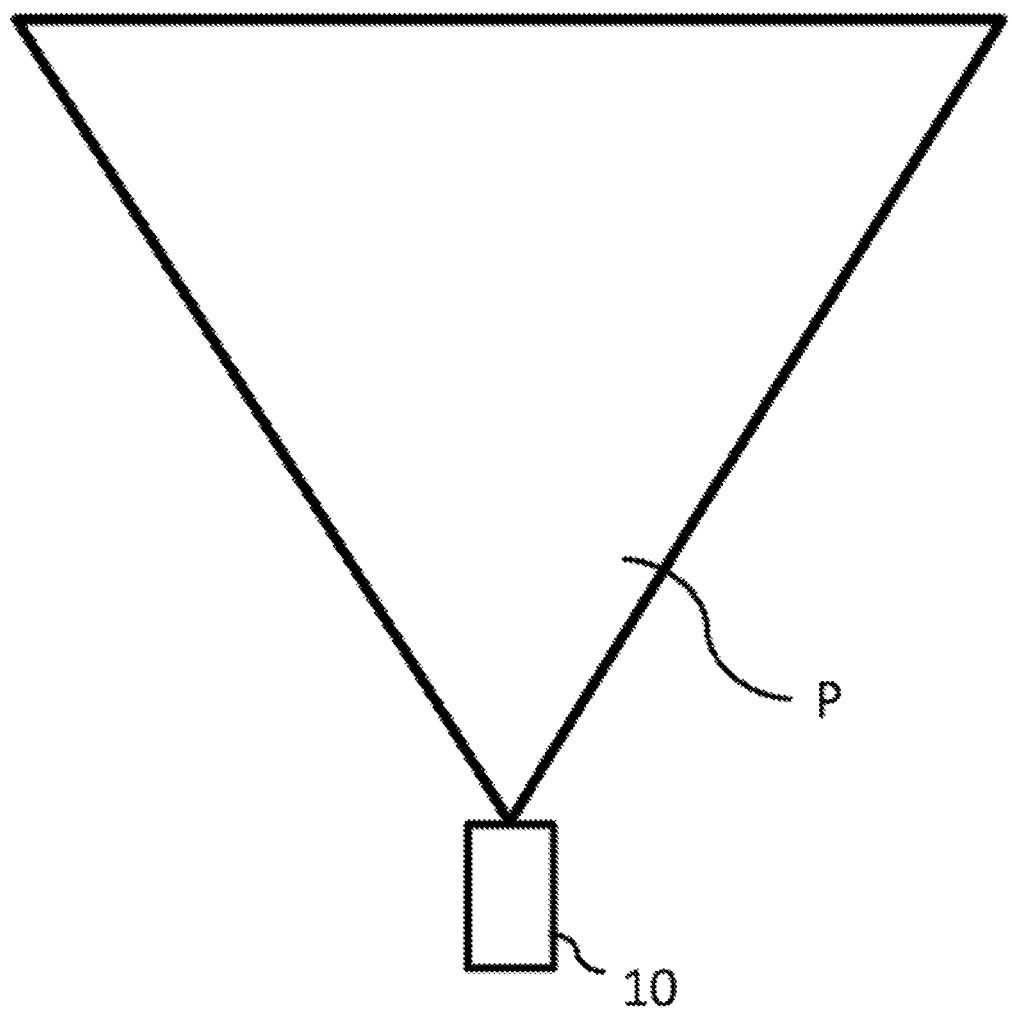
FIG. 4A illustrates a detection area of a second object detection unit of the object recognition device according to embodiment 1 of the present invention.
Figure 4B:
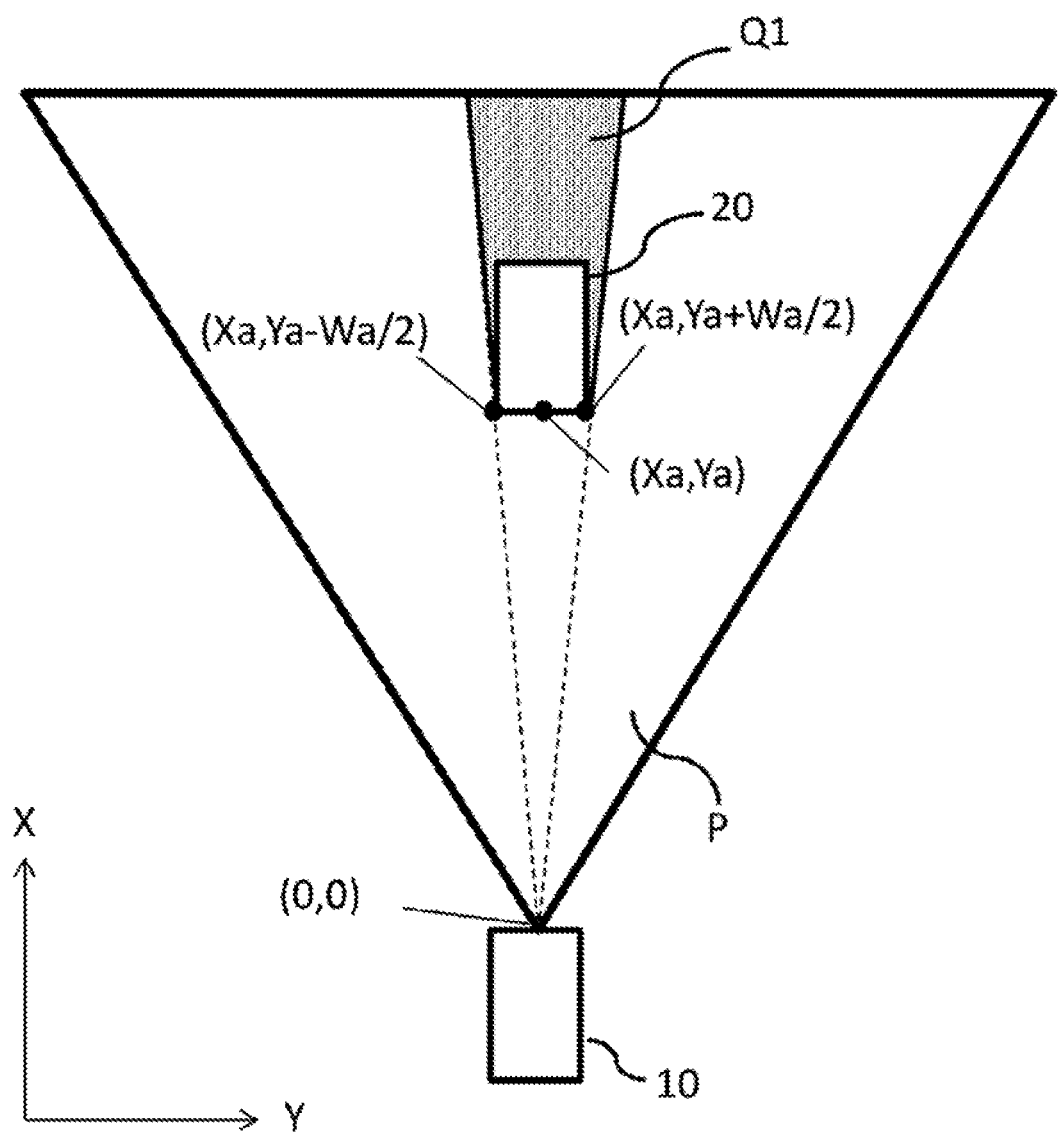
FIG. 4B illustrates an occlusion area for the second object detection unit of the object recognition device according to embodiment 1 of the present invention.

A specific example of a method for determining the occlusion area for the occlusion area detection processing unit 1201 will be described with reference to FIG. 4A and FIG. 4B. FIG. 4A shows a detection area P of the first object detection unit 1101 when there is no object around the own vehicle 10. In this case, the first object detection unit 1101 can detect all objects in the detection area P, and no occlusion area occurs. Next, FIG. 4B shows a state in which there is a surrounding object 20 in the detection area P. In this case, the surrounding object 20 becomes an obstacle to cause an area (occlusion area Q1) where the first object detection unit 1101 cannot perform detection.

In an X-Y coordinate system shown in FIG. 4B, where the position at which the first object detection unit 1101 is mounted on the own vehicle 10 is defined as the origin (0, 0), the vertical position and the horizontal position of the rear end center of the surrounding object 20 are respectively defined as Xa and Ya, and the width of the surrounding object 20 is defined as Wa, the caused occlusion area Q1 is determined to be an area (vertical position x, horizontal position y) that satisfies a condition A and a condition B below (step S2).

$$(Ya-Wa/2)/Xa \leq y \leq (Ya+Wa/2)/Xa \quad \text{Condition A:}$$

$$|Xa| \leq |x| \quad \text{Condition B:}$$

The number of occlusion areas is one in FIG. 4B, but in the case where there are a plurality of (n) surrounding objects, the above processing is performed for all the object detection results of the first object detection unit 1101, to determine occlusion areas Q1 to Qn for the first object detection unit 1101.

In the determination for the occlusion area, margins Mx, My may be set in accordance with object detection error in the X-axis direction or the Y-axis direction in the first object detection unit 1101, whereby the condition A and the condition B may be respectively changed into a condition A' and a condition B' as shown below, so as to narrow the occlusion area. It is noted that the margins Mx, My are set as positive values.

$$(Ya-Wa/2)/Xa+My \leq y \leq (Ya+Wa/2)/Xa-My \quad \text{Condition A':}$$

$$|Xa|+Mx \leq |x| \quad \text{Condition B':}$$

The values of the margins Mx, My may be changed on the basis of the accuracy information about the object detection position of the first object detection unit 1101. That is, when the object detection position accuracy is high, the margin Mx or the margin My is decreased, and when the object detection position accuracy is low, the margin Mx or the margin My is increased.

As described above, in accordance with detection error in the first object detection unit 1101, the margin may be set and the boundary of the area may be changed, whereby the occlusion area detection processing unit 1201 can further accurately determine the occlusion area. Thus, the possibility that an identical object is determined to be a different object can be further decreased.

Next, the association between an object detection result of the first object detection unit 1101 for which the occlusion area has been determined as described above, and an object detection result of the second object detection unit 1102, is determined by the association processing unit 1202. Specifically, among all the combinations of object detection results of the first object detection unit 1101 and object detection results of the second object detection unit 1102 in the association possible area, the association between each object detection result of the first object detection unit 1101 and each object detection result of the second object detection unit 1102 is determined, and the detection results that exhibit a great association are combined. That is, in embodiment 1, processing of selecting and combining the object detection results between which the difference in the distances from the own vehicle to the detected objects is the smallest, is performed. The information for which the association is to be taken is not limited to the distance to a detected object, but may be information such as the shape of a detected object that allows identification of the object.

Figure 5A:
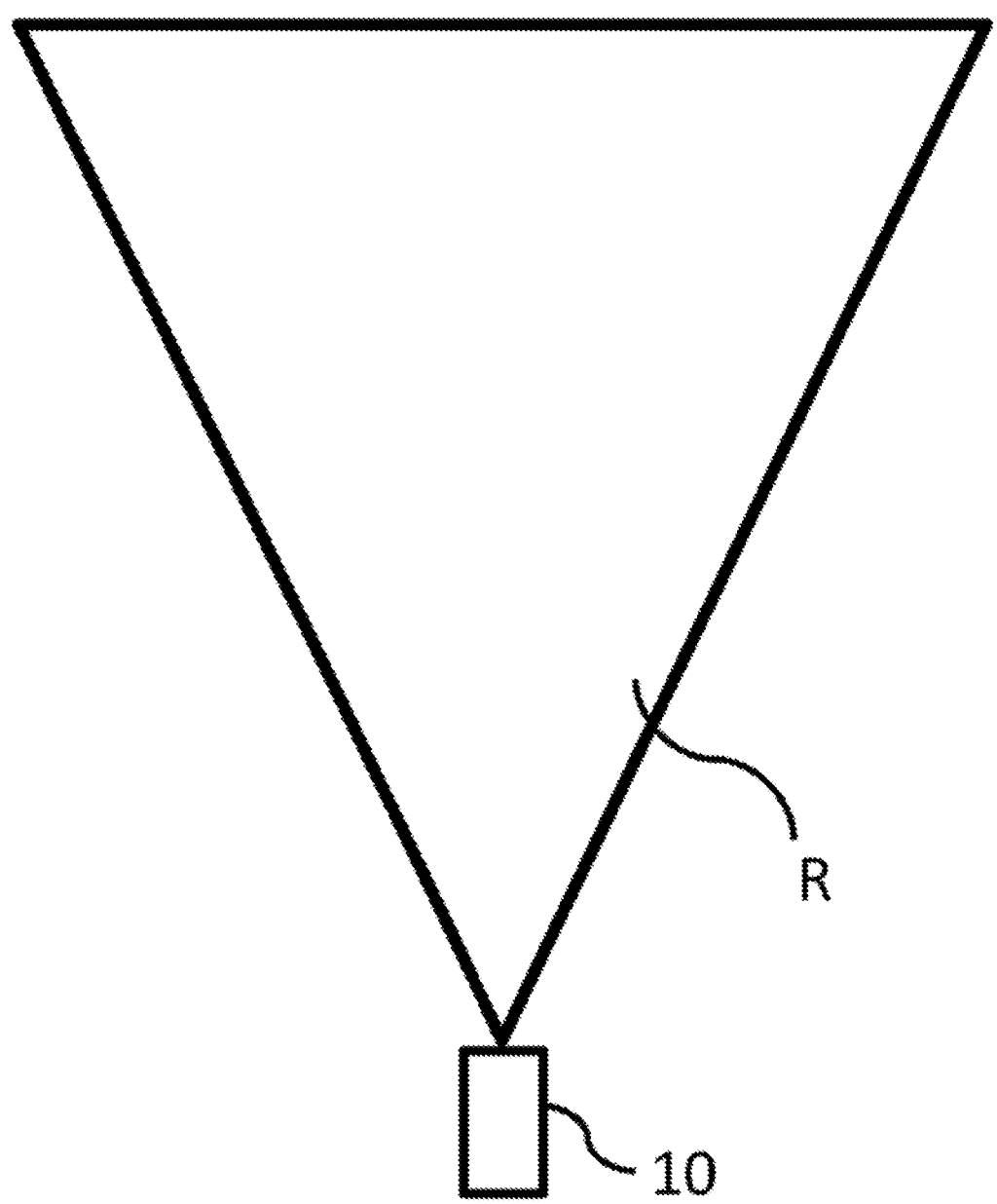
FIG. 5A illustrates a detection area of a first object detection unit of the object recognition device according to embodiment 1 of the present invention.
Figure 5B:
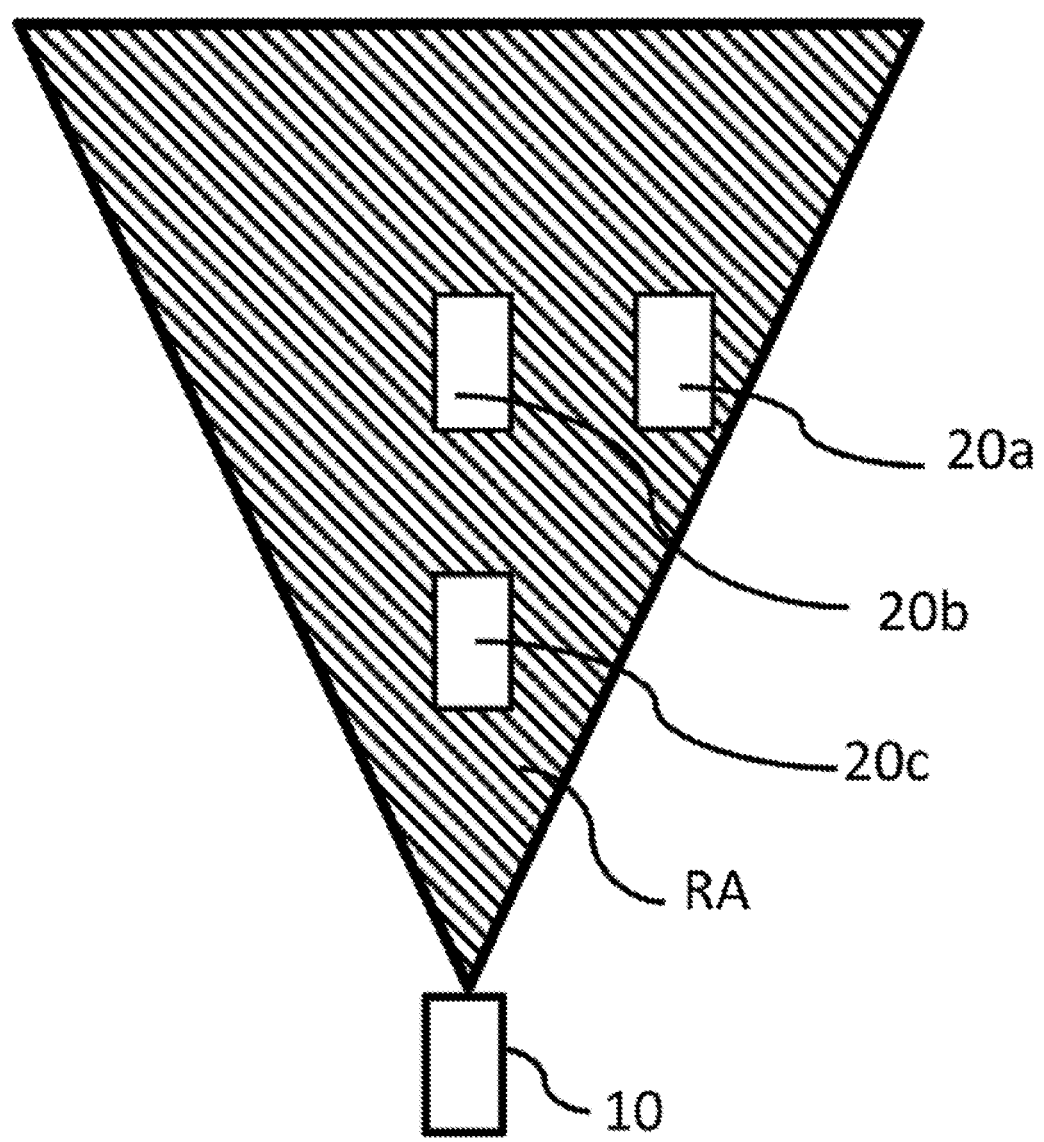
FIG. 5B illustrates an object detectable area of the first object detection unit of the object recognition device according to embodiment 1 of the present invention.

The association possible area will be described with reference to FIG. 5A to FIG. 5D. FIG. 5A shows the own vehicle 10 and a detection area R of the second object detection unit 1102. When there is no object around the own vehicle 10, as in the case of the first object detection unit 1101 described in FIG. 4A, it is possible to detect all objects in the detection area R and no occlusion area occurs. In addition, as shown in FIG. 5B, even when there are surrounding objects 20a, 20b, 20c which are other vehicles in front of the own vehicle 10, since the second object detection unit 1102 is a radar, an inter-vehicle communication device, or the like as described above, no occlusion area occurs owing to its detection characteristics, and thus the second object detection unit 1102 can detect an object in an object detectable area RA (step S4).

Figure 5C:
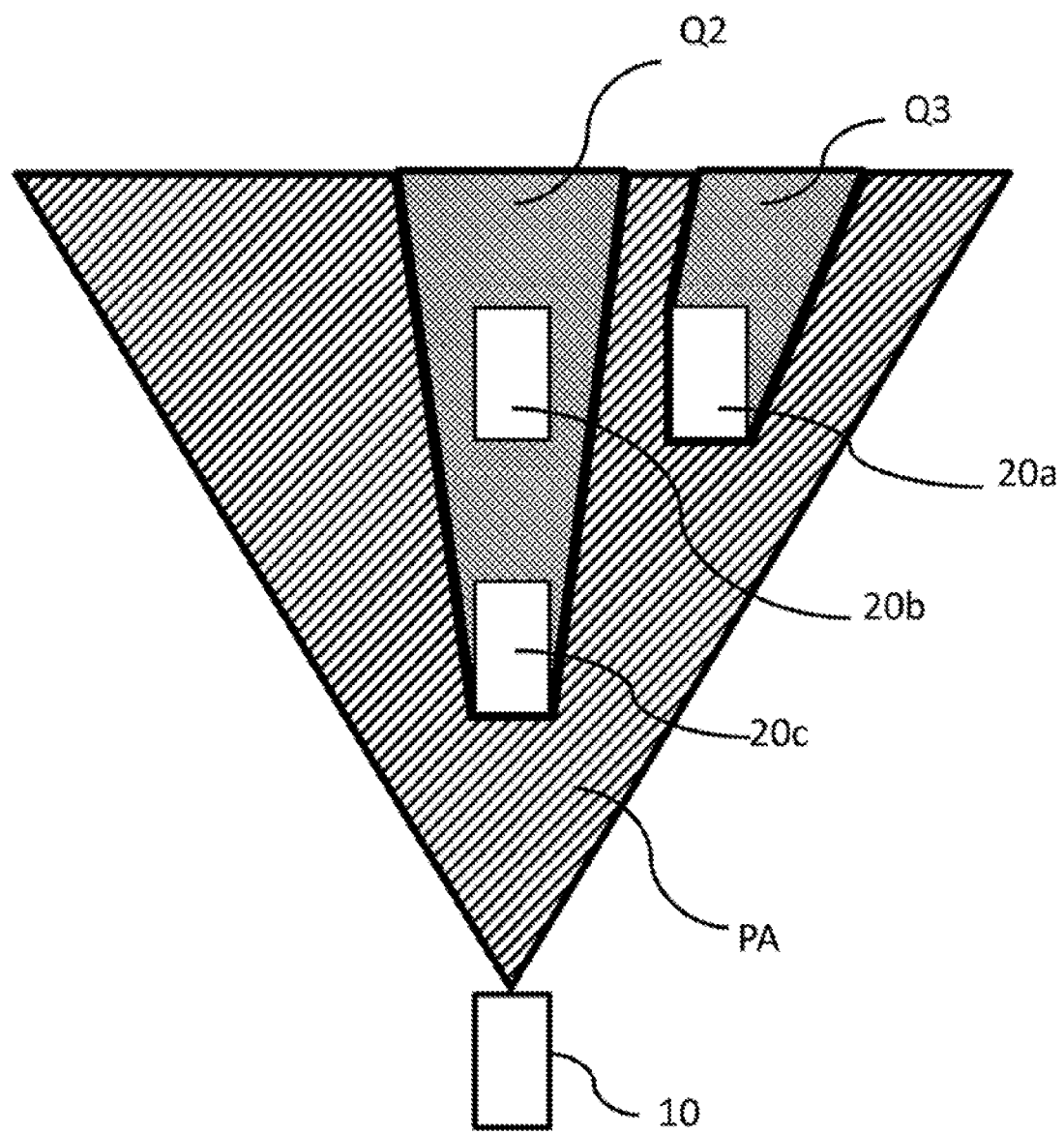
FIG. 5C illustrates an object detectable area of the second object detection unit of the object recognition device according to embodiment 1 of the present invention.
Figure 5D:
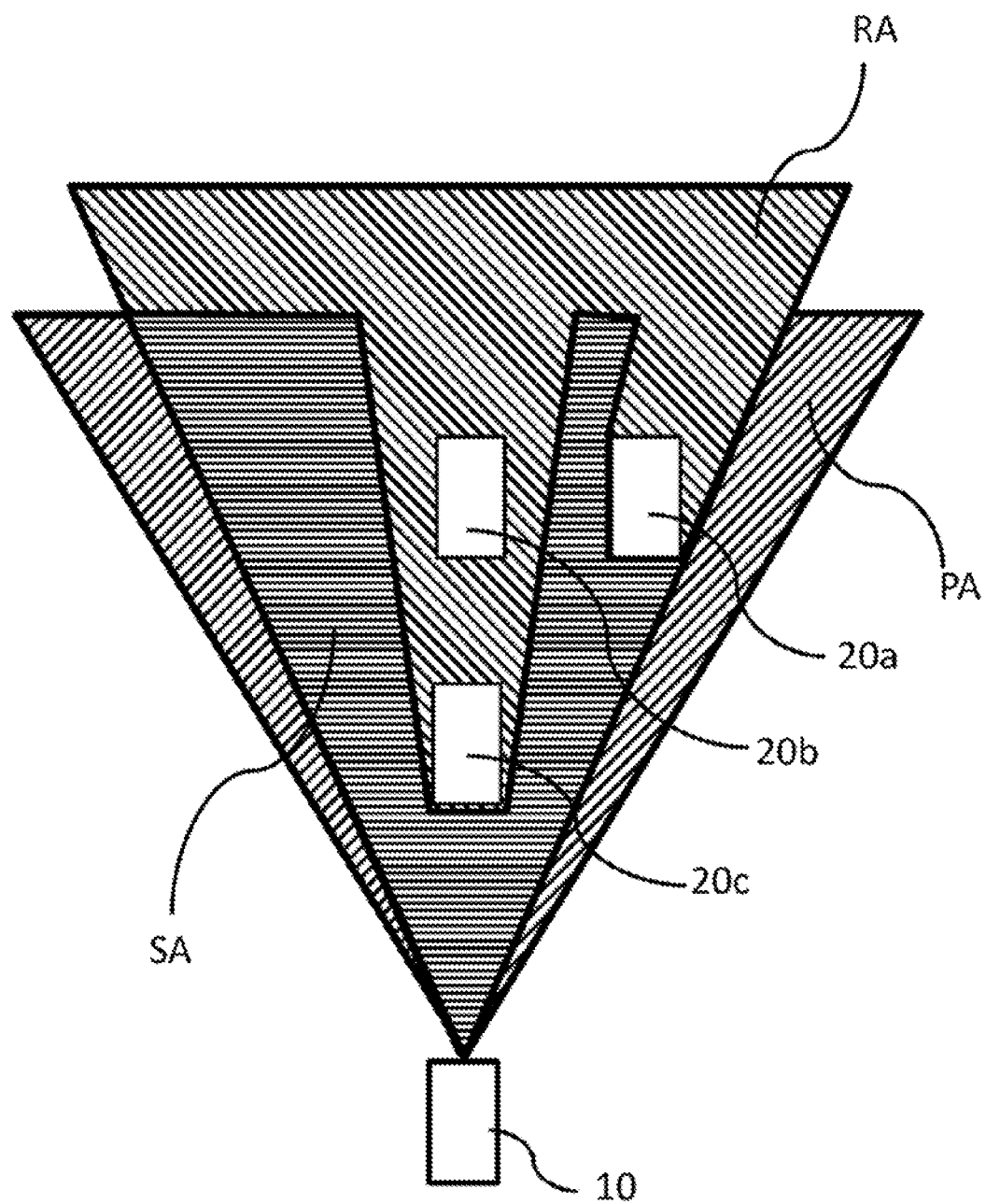
FIG. 5D illustrates an association possible area of an association processing unit of the object recognition device according to embodiment 1 of the present invention.

On the other hand, as shown in FIG. 5C, in the case where the first object detection unit 1101 detects the surrounding objects 20a, 20b, 20c in front of the own vehicle 10, as described in FIG. 4B, the surrounding objects 20a, 20b, 20c become obstacles and thus occlusion areas Q2, Q3 for which the first object detection unit 1101 cannot perform detection, occur. As a result, the first object detection unit 1101 can perform detection in an object detectable area PA excluding the occlusion areas Q2, Q3 (step S3). As shown in FIG. 5D, the association processing unit 1202 determines, as an association possible area SA, a range in which the detectable area PA of the first object detection unit 1101 and the detectable area RA of the second object detector 9-1102 (also referred to as second object detection unit 1102) overlap each other (step S5). Then, for the surrounding objects 20a, 20b, 20c detected in the association possible area SA, the association processing unit 1202 compares object detection results of the first object detection unit 1101 and object detection results of the second object detection unit 1102, and as described above, combines the object detection results between which the difference in the distances to the respective detected objects is the smallest (step S6).

The update processing unit 1203 determines that the object detection result of the first object detection unit 1101 and the object detection result of the second object detection unit 1102 that are combined with each other in the association processing by the association processing unit 1202 correspond to an identical object, and integrates the detection information therebetween, thereby specifying (recognizing) the position of each of the surrounding objects 20a, 20b, 20c and updating the recognition result for the specified object (step S7). For the integration, conventionally known means such as a-p filter or Kalman filter is used.

Using information about the recognized relative positions between the own vehicle 10 and the surrounding objects 20a, 20b, 20c around the own vehicle obtained from the object recognition processing unit 1200 as described above, the vehicle control unit 1300 performs control for a collision damage mitigation brake system for mitigating a damage when the own vehicle 10 collides with a frontward object, an adaptive cruise control system for following a frontward vehicle, and the like. That is, it is possible to perform autonomous driving of the own vehicle on the basis of an object recognition result from the object recognition processing unit 1200.

As described above, in embodiment 1 according to the present invention, associations are taken for only the association possible area excluding the occlusion area, whereby association is suppressed, and further, a different object present in the occlusion area is prevented from being determined to be an identical object. Thus, the possibility of occurrence of an object recognition result based on an erroneous combination (erroneous association) can be decreased.

Embodiment 2

Figure 6:
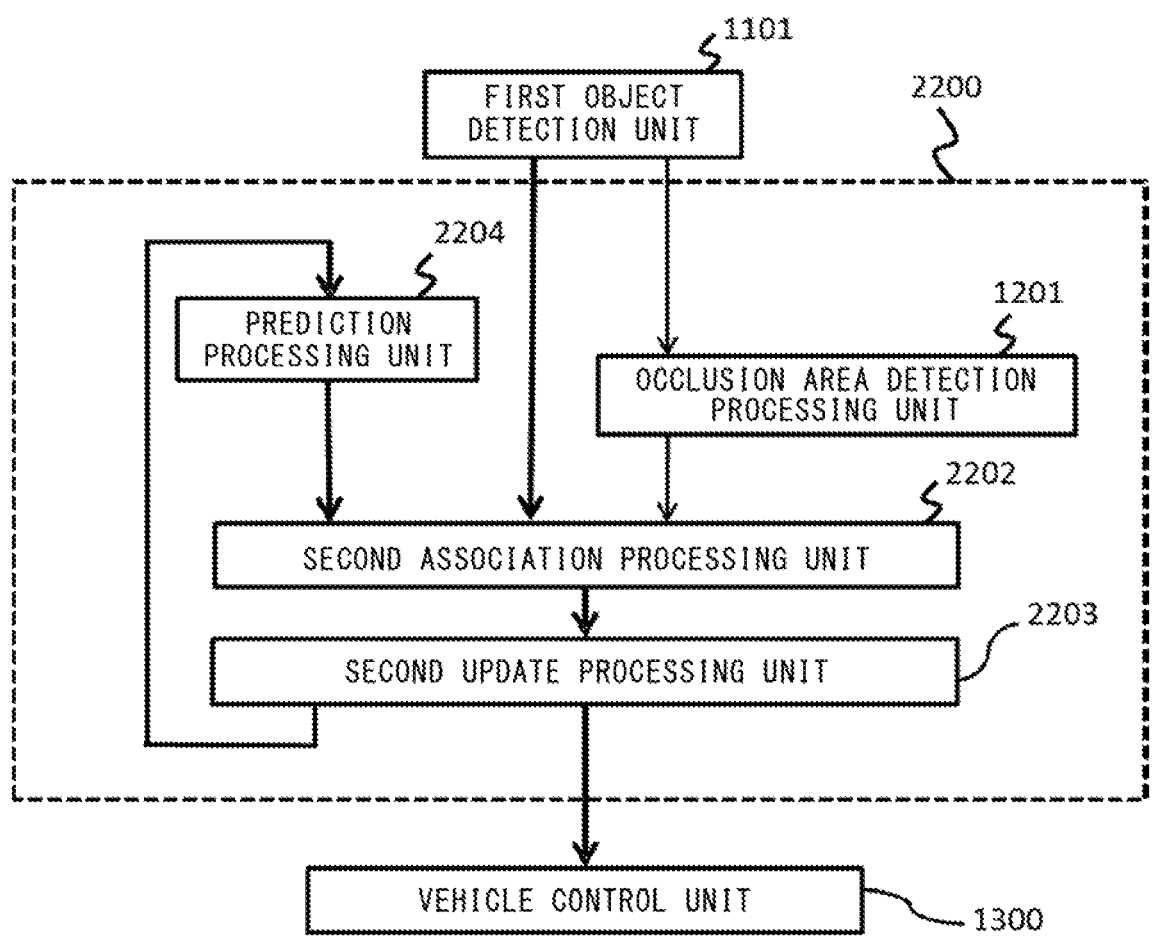
FIG. 6 is a block configuration diagram of an object recognition device according to embodiment 2 of the present invention.

FIG. 6 is a block configuration diagram showing a second object recognition device according to embodiment 2 of the present invention, together with the vehicle control unit 1300. It is noted that arrows in FIG. 6 indicate flows of signals.

In addition, the same reference characters as in embodiment 1 denote the same or corresponding parts.

The second object recognition device includes the first object detection unit 1101 and a second object recognition processing unit 2200, and the second object recognition processing unit 2200 includes the occlusion area detection processing unit 1201, a second association processing unit 2202, a second update processing unit 2203, and a prediction processing unit 2204. The second object recognition processing unit 2200 has the same hardware configuration as the object recognition processing unit 1200 as shown in FIG. 2.

In embodiment 2, unlike embodiment 1 in which the association processing unit 1202 calculates the association between object detection results of the first object detection unit 1101 and the second object detection unit 1102, the second association processing unit 2202 calculates the association between an object detection result of the first object detection unit 1101 and an output of the prediction processing unit 2204, whereby an object recognition result is outputted.

Figure 7:
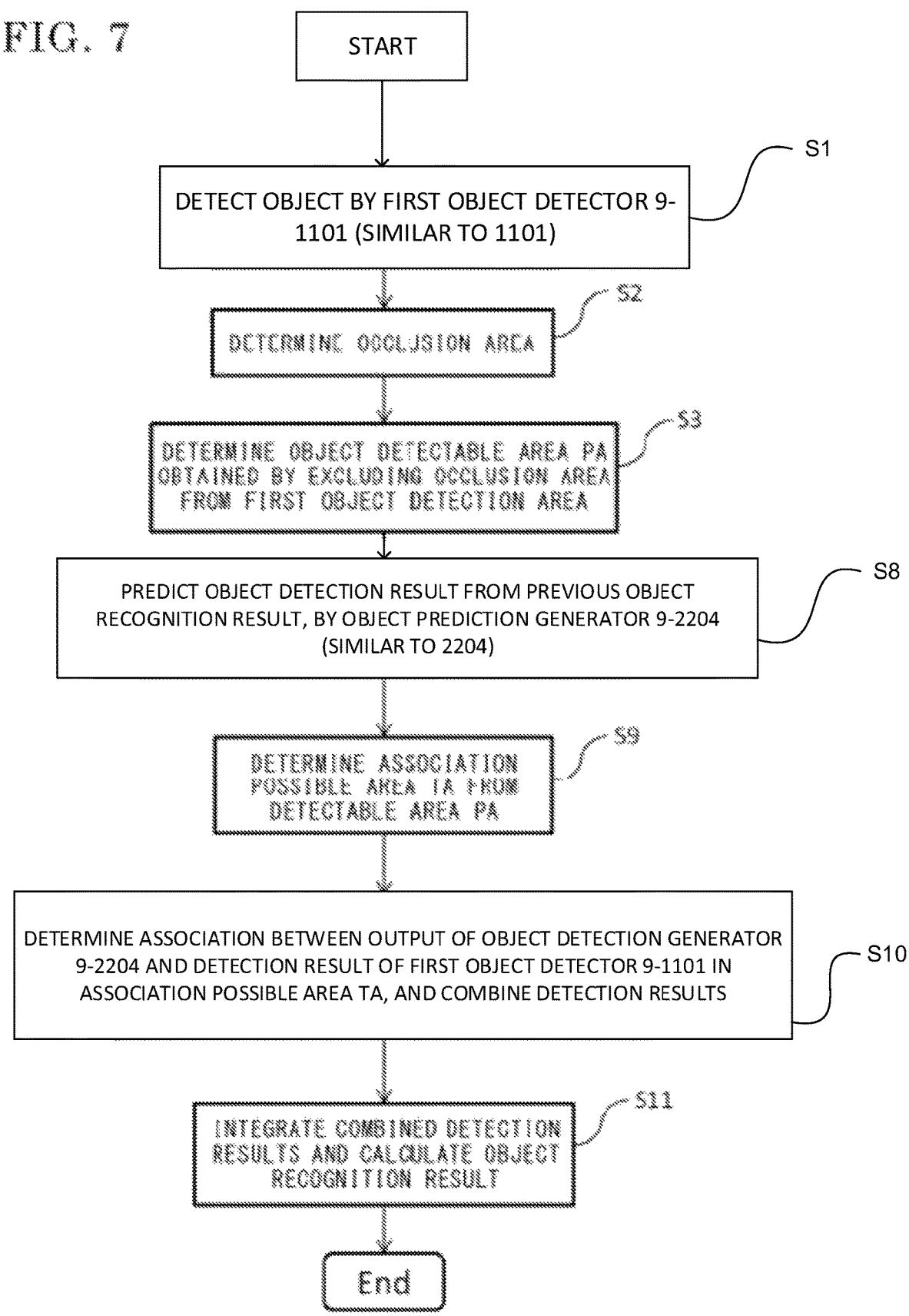
FIG. 7 is a flowchart showing operation of the object recognition device according to embodiment 2 of the present invention.

Next, a process until calculation of an object recognition result for object position information to be transmitted to the vehicle control unit 1300 of the second object recognition device configured as described above, will be described with reference to FIG. 7 and FIG. 8.

The procedure in which the occlusion area detection processing unit 1201 determines the occlusion area on the basis of an object detected by the first object detection unit 1101 and the detectable area PA excluding the occlusion area is determined, is the same as the procedure from step S1 to step S3 in FIG. 3 described in embodiment 1.

The prediction processing unit 2204 records an object recognition result outputted from the second update processing unit 2203 at time t1. Prediction processing unit 2204 may be referred to as object prediction generator 9-2204. When the first object detection unit 1101 detects an object at time t1+Δt, the prediction processing unit 2204 reads the object recognition result for time t1 recorded in the prediction processing unit 2204, and calculates an object prediction result obtained by shifting the read object recognition result to time t1+Δt at which the first object detection unit 1101 detects the object. The object prediction result calculated on the basis of the previous object recognition result as described above has the same information as the object recognition result. For example, in the case where the object recognition result includes the relative velocity of the object, the relative position of the object at time t1+Δt can be predicted using a difference Δt between time t1 at which the second update processing unit performs object recognition processing and time t1+Δt at which the first object detection unit 1101 detects the object, and the relative velocity of the object (step S8). It is noted that the object recognition result includes the object detection position, object width information, and object detection position accuracy information.

Figure 8:
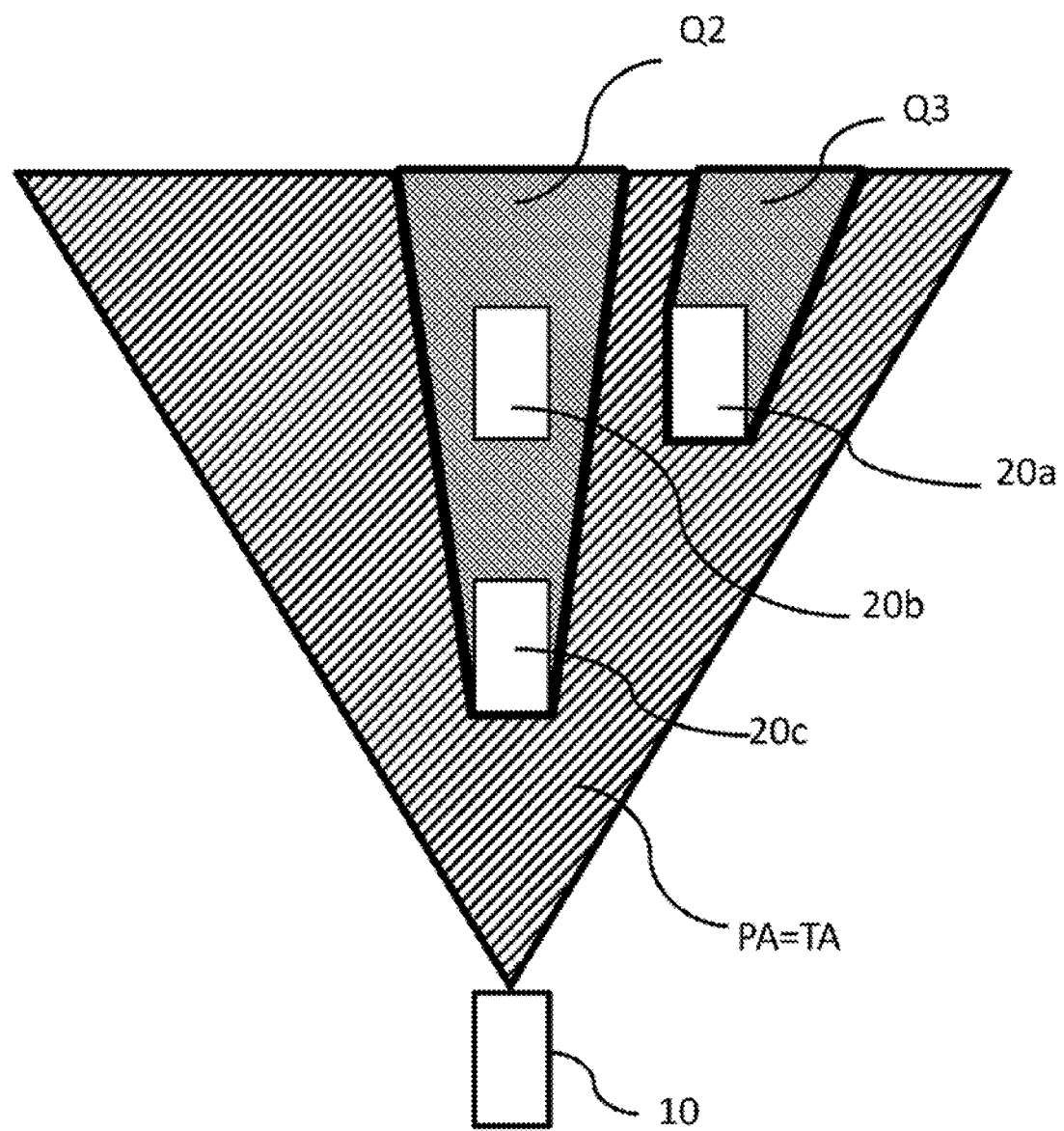
FIG. 8 illustrates an association possible area and an occlusion area for the object recognition device according to embodiment 2 of the present invention.

As shown in FIG. 8, the second association processing unit 2202 determines, as an association possible area TA, a range in which the object prediction result of the prediction processing unit 2204 described above and the detectable area PA of the first object detection unit 1101 overlap each other (step S9). For the surrounding objects 20a, 20b, 20c detected in the association possible area TA, the associations between object detection results of the first object detection unit 1101 and object prediction results of the prediction processing unit 2204 are determined. In this case, the association possible area TA determined by the second association processing unit 2202 becomes the same area as the object detectable area PA of the first object detection unit 1101.

Specifically, the following association processing is performed: among all the combinations of object detection results of the first object detection unit 1101 and object prediction results of the prediction processing unit 2204 in the association possible area, the object detection result of the first object detection unit 1101 and the object prediction result of the prediction processing unit 2204 between which the difference in the distances from the own vehicle to the objects is the smallest are combined (step S10). In other terms, at operation step S10 of FIG. 7, an association is determined between an output of the object detection generator 9-2204 and a detection result of the first object detector 9-1101 in association possible area TA, and the detection results are combined. The information for which the association is to be taken is not limited to the distance difference, but may be information such as the shape of the object that allows identification of the object.

As described above, the times of the object recognition result and the object detection result to be used when the association processing is performed are matched with each other, whereby the object recognition result and the object detection result can be accurately combined.

As in the update processing unit 1203, the second update processing unit 2203 determines, as an identical object, the object detection result of the first object detection unit 1101 and the object prediction result outputted from the prediction processing unit 2204 that have been combined in the association processing by the second association processing unit 2202, and integrates these results, thereby specifying (recognizing) the position of each of the surrounding objects 20a, 20b, 20c and updating the recognition result for the specified object (step S11). For the integration, conventionally known means such as α-β filter or Kalman filter is used.

As described above, in embodiment 2 according to the present invention, the association between an object prediction result of the prediction processing unit and an object detection result of the object detection unit is taken, whereby accuracy of an object recognition result can be increased, and further, a different object present in the occlusion area is prevented from being determined to be an identical object. Thus, the possibility of occurrence of an object recognition result based on an erroneous combination (erroneous association) can be decreased.

It is noted that, within the scope of the present invention, the above embodiments may be freely combined with each other, or each of the above embodiments may be modified or simplified as appropriate.

FIG. 9A, corresponding to the first embodiment, is a version of FIG. 1 with some different labels. The layout of FIG. 9A is similar to the layout of FIG. 1, and the correspondence of items in FIG. 1 with FIG. 9A is 1:1; for example item 9-1102 of FIG. 9A corresponds to item 1102 of FIG. 1. The functions and relationships of the items in FIG. 9A are the same functions and relationships as in FIG. 1.

FIG. 9A includes an object detection generator 9-1102, a first object detector 9-1101, an object recognition processing unit 9-1200. The object recognition processing unit 9-1200 includes the occlusion area detection processing unit 1201, an association processor 9-1202 and an update processor 9-1203. Finally, FIG. 9A also illustrates the vehicle control unit 1300.

Figure 9B:
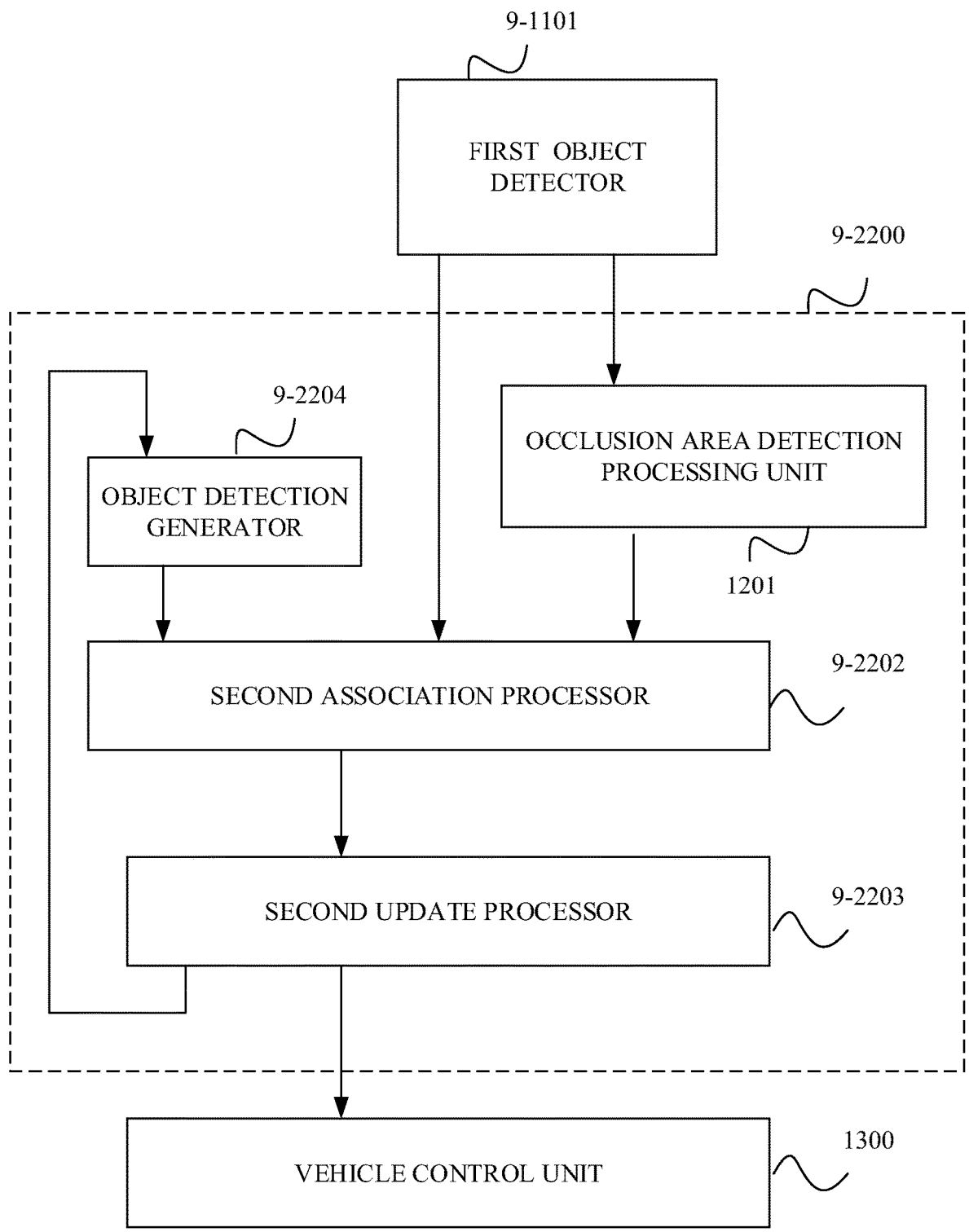
FIG. 9B, similar to FIG. 6, is a block configuration diagram of an object recognition device according to embodiment 2 of the present invention.

FIG. 9B, corresponding to the second embodiment, is a version of FIG. 6 with some different labels. The layout of FIG. 9B is similar to the layout of FIG. 6, and the correspondence of items in FIG. 6 with FIG. 9B is 1:1; for example item 9-2204 of FIG. 9B corresponds to item 2204 of FIG. 6. The functions and relationships of the items in FIG. 9B are the same functions and relationships as in FIG. 6.

FIG. 9B includes an object detection generator 9-2204, the first object detector 9-1101, an object recognition processing unit 9-2200. The object recognition processing unit 9-2200 includes the occlusion area detection processing unit 1201, a second association processor 9-2202 and a second update processor 9-2203. Finally, FIG. 9A also illustrates the vehicle control unit 1300.

DESCRIPTION OF THE REFERENCE CHARACTERS 1101 first object detection unit
1102 second object detection unit
1200 object recognition processing unit
1201 occlusion area detection processing unit
1202 association processing unit
1203 update processing unit
1300 vehicle control unit
2200 second object recognition processing unit
2202 second association processing unit
2203 second update processing unit

The invention claimed is:

1. An object recognition device comprising:
first object detector mounted on a vehicle and configured to detect a surrounding object around the vehicle, the first object detector causing an occlusion area in association with the detected surrounding object;
an occlusion area detection processor configured to determine the caused occlusion area;
object detection generator configured to generate a second object detection result of which an association is taken with a first object detection result of the first object detector;
an association processor configured to take an association between the first object detection result and the second object detection result in an area excluding the occlusion area determined by the occlusion area detection processor; and
an update processor configured to, when the association processor determines that the first object detection result and the second object detection result are detection results for an identical object, calculate a recognition result for the surrounding object on the basis of the first object detection result and the second object detection result, and update the recognition result, wherein
the vehicle is controlled on the basis of the recognition result of the update processor.

2. The object recognition device according to claim 1, wherein
the association processor selects detection results having a high association between the first object detection result and the second object detection result.

3. The object recognition device according to claim 2, wherein
information for which the association is taken is information about a distance from the vehicle to the surrounding object that is detected.

4. The object recognition device according to claim 1, wherein
the object detection generator is a second object detector that does not cause an occlusion area.

5. The object recognition device according to claim 1, wherein
the object detection generator is a prediction processor configured to output an object detection result predicted on the basis of the recognition result calculated by the update processor.

6. The object recognition device according to claim 1, wherein
the occlusion area detection processor determines the occlusion area on the basis of a width of the surrounding object and a distance from the vehicle to the surrounding object, detected by the first object detector.

7. An object recognition method for recognizing a surrounding object and controlling a vehicle on the basis of recognized information, the method comprising:
determining an occlusion area caused by a first detector, in association with a surrounding object, in the detection of said surrounding object;
determining a first detectable area obtained by excluding the occlusion area from a detection area for the surrounding object;
determining a second detectable area of a second detector which does not cause an occlusion area;
for the surrounding objects present in both of the first detectable area and the second detectable area, detecting object information including distances to the surrounding objects, using the first detector and the second detector; and
recognizing a combination of detection results between which a difference in the detected distances is smallest, as object information about an identical object.

8. The object recognition method according to claim 7, wherein
in determination of the occlusion area, a margin for canceling out detection error is set, in accordance with object detector accuracy.

9. An object recognition method for recognizing a surrounding object and controlling a vehicle on the basis of recognized information, the method comprising:
determining an occlusion area caused by a first detector, in association with a surrounding object, in the detection of the surrounding object;
determining a first detectable area obtained by excluding the occlusion area from a detection area for the surrounding object;
taking an association between a detection result of the surrounding object present in the first detectable area and a prediction result obtained by predicting a present position from a result of previous detection of the surrounding object, regarding a distance to the surrounding object; and
recognizing a combination of a detection result and a prediction result between which a difference in the distances is smallest, as object information about an identical object.

10. The object recognition method according to claim 9, wherein
in determination of the occlusion area, a margin for canceling out detection error is set, in accordance with object detector accuracy.

* * * * *